United States Patent
Ni et al.

(10) Patent No.: US 10,133,925 B2
(45) Date of Patent: Nov. 20, 2018

(54) HUMAN-MACHINE INTERFACE GUIDANCE/INDICATION DEVICE AND METHOD FOR IRIS RECOGNITION OF MOBILE TERMINAL

(71) Applicant: SUZHOU SIYUAN KEAN INFORMATION TECHNOLOGY CO., LTD., Suzhou, Jiangsu (CN)

(72) Inventors: Weimin Ni, Zhejiang (CN); Hongquan Shen, Zhejiang (CN)

(73) Assignee: SUZHOU SIYUAN KEAN INFORMATION TECHNOLOGY CO., LTD., Suzhou, Jiangsu (CN)

( * ) Notice: Subject to any disclaimer, the term of this patent is extended or adjusted under 35 U.S.C. 154(b) by 107 days.

(21) Appl. No.: 15/458,348

(22) Filed: Mar. 14, 2017

(65) Prior Publication Data

US 2017/0185840 A1 Jun. 29, 2017

Related U.S. Application Data

(63) Continuation of application No. PCT/CN2015/088852, filed on Sep. 2, 2015.

(30) Foreign Application Priority Data

Sep. 15, 2014 (CN) .......................... 2014 1 0468297

(51) Int. Cl.
*H04N 9/47* (2006.01)
*H04N 7/18* (2006.01)
(Continued)

(52) U.S. Cl.
CPC ..... *G06K 9/00604* (2013.01); *G06K 9/00912* (2013.01); *G06K 9/3208* (2013.01)

(58) Field of Classification Search
None
See application file for complete search history.

(56) References Cited

U.S. PATENT DOCUMENTS 7,898,719 B2 * 3/2011 Schofield ................ B60R 1/088
359/267
2004/0133477 A1 * 7/2004 Morris ..................... A47F 9/047
705/21

FOREIGN PATENT DOCUMENTS

| CN | 1892676 A | 1/2007 |
| CN | 103870819 A | 6/2014 |
| CN | 104199553 A | 12/2014 |

OTHER PUBLICATIONS

State Intellectual Property Office of the P.R. China (ISR/CN), "International Search Report for PCT/CN2015/088852", China, dated Dec. 31, 2015.

* cited by examiner

*Primary Examiner* — Talha M Nawaz
(74) *Attorney, Agent, or Firm* — Locke Lord LLP; Tim Tingkang Xia, Esq.

(57) ABSTRACT

The present disclosure provides a human-machine interface guidance/indication device for iris recognition of a mobile terminal, comprising a mobile terminal and an iris recognition imaging module; the mobile terminal comprises a visible light LED (light emitting diode) and a display screen respectively in signal connection with a processor chip; the iris recognition imaging module comprises an imaging sensor and a near-infrared LED lighting source, and a near-infrared optical filter and an optical imaging lens are arranged on the imaging sensor; the processor chip is in signal connection with the imaging sensor and the near-infrared LED lighting source respectively.

14 Claims, 2 Drawing Sheets

(51) Int. Cl.
*G06K 9/00* (2006.01)
*G06K 9/32* (2006.01)

HUMAN-MACHINE INTERFACE GUIDANCE/INDICATION DEVICE AND METHOD FOR IRIS RECOGNITION OF MOBILE TERMINAL

CROSS REFERENCE TO RELATED APPLICATIONS

The present application is a continuation of international application no. PCT/CN2015/088852, filed on Sep. 2, 2015, which claims priority to China Patent Application no. 201410468297.4, filed on Sep. 15, 2014, both of which are hereby incorporated by reference in their entireties.

TECHNICAL FIELD

The present disclosure relates to the biometric identification optical-mechanical-electrical field, and more particularly, to a human-machine interface guidance/indication device and method for iris recognition of a mobile terminal.

BACKGROUND

Mobile terminals include smart mobile phones, tablets, wearable devices and so on. Seen from a mobile development trend to existing information technologies, mobile terminal devices necessarily are devices used the most widely in future.

At present, in practical application, mobile terminals have been widely used in mobile secure payment, secure account login and Internet banking, for example, Yu Ebao (an APP), WeChat (an APP), Credit Card Manager (an APP) and so on. Application of mobile terminals in these aspects provides great convenience for life. However, a new-type economic crime via characteristics such as weak safety performance of mobile terminals gradually rises.

In mobile terminals, a habitually-used means for identity authentication in the prior art is password input. However, this means for ID authentication is very low in safety performance. Thus, the password may be divulged as long as a simple virus program is implanted into the mobile terminals, and corresponding loss may be caused. To solve this problem, internationally biological recognition is used for security identity authentication of mobile terminals, for example, a fingerprint recognition technique proposed by Apple Inc. based on AuthenTec. This technique is used on mobile phone terminals and greatly improves identity authentication security of the mobile terminals. However, in the process of fingerprint recognition, since a fingerprint is static, fingerprint information may be easily acquired or even imitated although the fingerprint is unique. Therefore, as the fingerprint technique is more and more widely used in mobile terminals, its security is on a downward trend. For this reason, an iris recognition more advantageous in security is an effective method to solve the problem in the process of security identity authentication of mobile terminals, and an iris recognition system is the most secure in secure living body anticounterfeiting features in the existing biological recognition.

How an iris recognition of a mobile terminal provides an effective human-machine interface guidance/indication when the mobile terminal is used by a user may have a direct impact on a recognition speed and a recognition rate, and still further have an impact on use experience and convenience of the user. At present, a human-machine interface guidance/indication having high use experience and convenience is lacked, and a design thereof is specifically implemented.

The present disclosure needs to solve a problem as below.

A human-machine interface guidance/indication method for iris recognition of a mobile terminal is specifically implemented, which has a human-machine interface for guidance/indication having high user use experience and use convenience.

SUMMARY OF THE INVENTION

The present disclosure specifically implements a human-machine interface guidance/indication method for iris recognition of a mobile terminal, which has a human-machine interface for guidance/indication having high user use experience and use convenience.

The present disclosure provides a human-machine interface guidance/indication device for iris recognition of a mobile terminal, including a mobile terminal and an iris recognition imaging module; the mobile terminal includes a visible light LED (light emitting diode) and a display screen respectively in signal connection with a processor chip; the iris recognition imaging module includes an imaging sensor and a near-infrared LED lighting source, and a near-infrared optical filter and an optical imaging lens are arranged on the imaging sensor; the processor chip is in signal connection with the imaging sensor and the near-infrared LED lighting source respectively, wherein guidance/indication of the human-machine interface are generated by a mirrored visual feedback and/or guidance/indication of the human-machine interface are generated by an imaging feedback of an image displayed on the display screen.

The present disclosure further provides a human-machine interface guidance/indication method for iris recognition of a mobile terminal, wherein the mobile terminal includes a visible light LED and a display screen respectively in signal connection with a processor chip; the iris recognition is achieved by an iris recognition imaging module, the iris recognition imaging module includes an imaging sensor and a near-infrared LED lighting source, and a near-infrared optical filter and an optical imaging lens are arranged on the imaging sensor; and the processor chip is in signal connection with the imaging sensor and the near-infrared LED lighting source respectively. According to the human-machine interface guidance/indication method, guidance/indication of the human-machine interface are generated by a mirrored visual feedback and/or guidance/indication of the human-machine interface are generated by an imaging feedback of an image displayed on the display screen.

As an improvement of the human-machine interface guidance/indication method for iris recognition of a mobile terminal as recited in the present disclosure, a step of forming the guidance/indication according to the mirrored visual feedback are as below: the near-infrared optical filter reflects visible light of the visible light LED and/or the display screen so that an ideal common optical axis direct view is formed since an optical axis of a user's eyes and an optical axis of the iris recognition imaging module are identical.

A pixel offset between a display imaging center of the display screen and an optical center of the iris recognition imaging module is:
X_PIXEL_OFFSET=Y_PIXEL_OFFSET=0.

A rotation angle of the iris recognition imaging module is:
θPAN=θTILT=0.

As further improvement of the human-machine interface guidance/indication method for iris recognition of a mobile terminal as recited in the present disclosure, steps of forming the guidance/indication according to the imaging feedback of an image displayed on the display screen are as below: the processor chip controls to turn on the near-infrared LED lighting source; after an optical bioeffect in absorption, scattering and reflection at an objective iris, near-infrared light radiated by the near-infrared LED lighting source enters into the near-infrared optical filter and non-imaging disturbing light therein is filtered, filtered imaging wavelength light enters into the optical imaging lens; it is achieved that non-contact optical physics are focused to the imaging sensor through the optical imaging lens, an image optical signal is converted by the imaging sensor into an image electrical signal which is outputted into the processor chip, and the processor chip displays the image on the display screen after a center pixel offset or PAN/TILT angle rotation processed by the iris recognition imaging module.

As further improvement of the human-machine interface guidance/indication method for iris recognition of a mobile terminal as recited in the present disclosure, processes of the center pixel offset are as below: first of all, an imaging center pixel offset (X_PIXEL_OFFSET, Y_PIXEL_OFFSET) displayed on the display screen is set up; and steps for calculating the imaging center pixel offset (X_PIXEL_OFFSET, Y_PIXEL_OFFSET) are as below:

$X\_PIXEL\_OFFSET = X\_OFFSET * PIXEL\_RESOULATION;$ $Y\_PIXEL\_OFFSET = Y\_OFFSET * PIXEL\_RESOULATION;$ $X\_OFFSET = Xd - Xm;$ $Y\_OFFSET = Yd - Ym;$ $PIXEL\_RESOULATION = POI/SOI;$ wherein the X_OFFSET and the Y_OFFSET are XY-axis coordinate offsets of a physical location between the display imaging center of the display screen and the optical center of the iris recognition imaging module; the POI is a pixel dimension of a preset iris diameter; 150 pixel≤POI≤300 pixel; the SOI is a physical dimension of the preset iris diameter; 10 mm≤SOI≤12 mm; the imaging center pixel offset (X_PIXEL_OFFSET, Y_PIXEL_OFFSET) meets: X_PIXEL_OFFSET≤20%*X_ROI, and Y_PIXEL_OFFSET≤20%*Y_ROI; the X_ROI is an X-axis full resolution pixel number of the imaging sensor; and the Y_ROI is a Y-axis full resolution pixel number of the imaging sensor.

As further improvement of the human-machine interface guidance/indication method for iris recognition of a mobile terminal as recited in the present disclosure, processes of the center pixel offset or PAN/TILT(X/Y axis) angle rotation of the iris recognition imaging module are as below: the processor chip performs following PAN/TILT(X/Y axis) angle rotation treatment on the image, and the PAN/TILT (X/Y axis) angle rotation is: $\theta PAN = \arctan((Xd-Xm)/Ze)$, and $\theta TILT = \arctan((Yd-Ym)/Ze)$; and the θPAN and θTILT angle rotation of the iris recognition imaging module meets: θPAN≤15 degrees, and θTILT≤15 degrees.

As further improvement of the human-machine interface guidance/indication method for iris recognition of a mobile terminal as recited in the present disclosure, the visible light LED is configured to indicate an appropriate user application scope, and indicate recognition failure and recognition success information, etc.

As further improvement of the human-machine interface guidance/indication method for iris recognition of a mobile terminal as recited in the present disclosure, the display screen is configured to display information indicating an appropriate user application scope, recognition failure and recognition success, etc.

As further improvement of the human-machine interface guidance/indication method for iris recognition of a mobile terminal as recited in the present disclosure, the display screen is an LCD or an OLED.

In summary, the human-machine interface guidance/indication device for iris recognition of a mobile terminal according to the present disclosure implements following effects: an iris recognition of a mobile terminal provides an effective human-machine interface guidance/indication when the mobile terminal is used by a user, a recognition speed and a recognition rate are improved, and still further use experience and convenience are improved for the user. An iris recognition of a mobile terminal according to the present disclosure provides an effective human-machine interface guidance/indication when the mobile terminal is used by a user, an ideal common optical axis direct view instead of an oblique view is formed by adopting a mirrored visual feedback, and/or a direct view instead of an oblique view is generated by imaging feedback of an image displayed on the display screen. The guidance/indication generated by a mirrored visual feedback have naturality and convenience for use by a user. The guidance/indication generated by an imaging feedback of an image displayed on the display screen have a more obvious effect in directly viewing image and information displayed in real time. Therefore, by adopting the human-machine interface guidance/indication method according to the specific embodiments described in the present disclosure, a recognition speed and a recognition rate can be effectively improved, and still further use experience and convenience may be improved for a user.

DESCRIPTION OF DRAWINGS

Following further describes specific implementation modes of the present disclosure in detail with reference to the accompanying drawings.

SPECIFIC EMBODIMENTS

Figure 2:
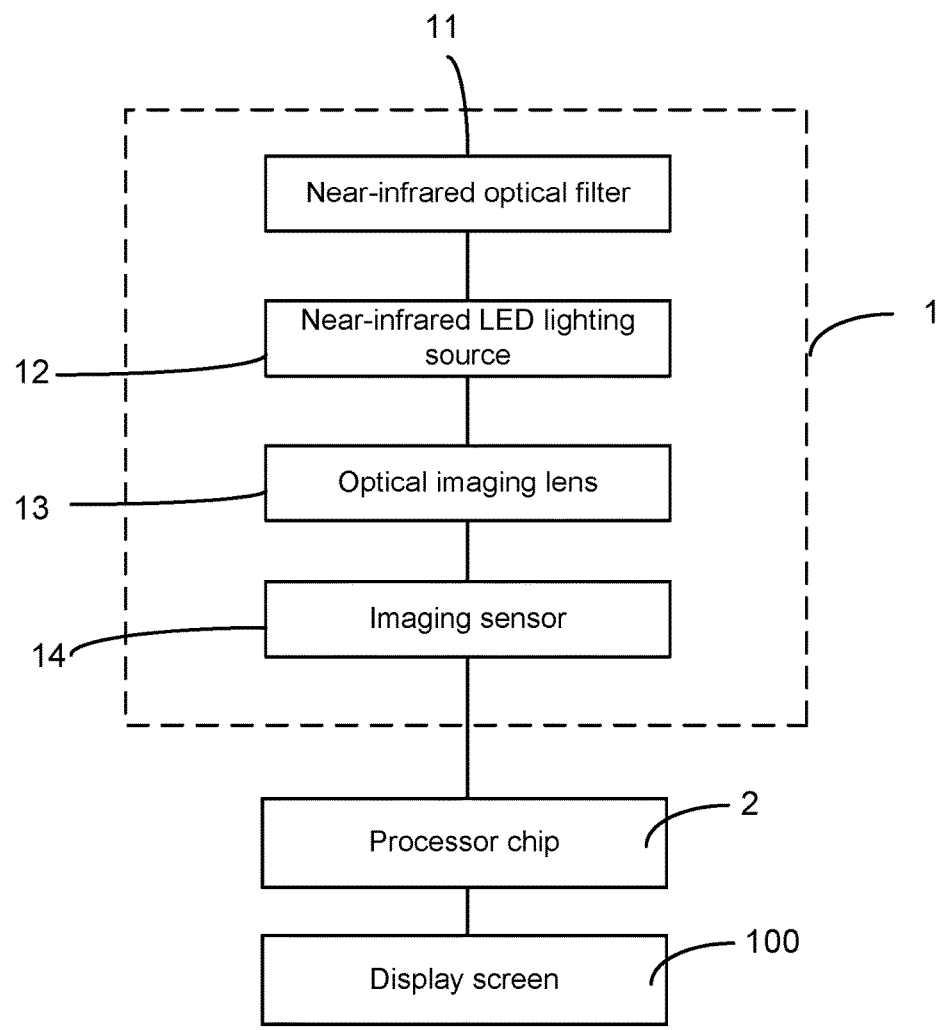
FIG. 2 is a schematic diagram of a main structure of a human-machine interface guidance/indication device for iris recognition of mobile terminal according to the present disclosure.

Embodiment 1 and FIG. 2 provide a human-machine interface guidance/indication device and method for iris recognition of mobile terminal. The human-machine interface guidance/indication device for iris recognition of a mobile terminal provided by the present disclosure includes a mobile terminal and an iris recognition imaging module 1; the mobile terminal includes a visible light LED, a display screen 100 and a processor chip 2, wherein the visible light LED and the display screen 100 are respectively in signal connection with the processor chip 2; the iris recognition imaging module 1 (used for physical imaging and outputting an iris image) includes a near-infrared optical filter 11, a near-infrared LED lighting source 12, an optical imaging lens 13 and an imaging sensor 14; the optical imaging lens 13 and the near-infrared optical filter 11 are arranged on the imaging sensor 14; and the imaging sensor 14 and the near-infrared LED lighting source 12 are in signal connection with the processor chip 2 respectively. The processor chip 2 is configured to receive an iris image outputted by the iris recognition imaging module 1 and provide a feedback control of guidance/indication for the human-machine interface according to the iris image outputted by the iris recognition imaging module 1.

The processor chip 2 controls to turn on the near-infrared LED lighting source 12; after an optical bioeffect in absorption, scattering and reflection at an objective iris, near-infrared light radiated by the near-infrared LED lighting source 12 enters into the near-infrared optical filter 11 and non-imaging disturbing light therein is filtered, filtered imaging wavelength light enters into the optical imaging lens 13; the optical imaging lens 13 is an automatic focusing (AF) optical imaging lens or a fixed focusing optical imaging lens and is configured to achieve an objective that non-contact optical physics are focused to the imaging sensor 14 positioned in image space, the imaging sensor 14 converts an image optical signal into an image electrical signal which is outputted into the processor chip 2, and the processor chip 2 displays the image on the display screen 100.

The guidance/indication of the human-machine interface are mainly implemented by the following two methods: guidance/indication generated by a mirrored visual feedback and/or guidance/indication generated by an imaging feedback of an image displayed on the display screen.

The guidance/indication generated by a mirrored visual feedback:

The guidance/indication generated by a mirrored visual feedback includes being cooperatively achieved by the near-infrared optical filter 11 and the visible light LED and/or the display screen 100 (visible light emitted by the visible light LED is visible to eyes after being reflected by the near-infrared optical filter 11; the display screen 100 also can emit visible light which is also visible to eyes after being reflected by the near-infrared optical filter 11; but near-infrared light emitted by the near-infrared LED lighting source 12 is used for eye iris imaging and is invisible to eyes), the near-infrared optical filter 11 reflects visible light of the visible light LED and/or the display screen 100, and is configured to provide guidance/indication for a user for forming the mirrored visual feedback, an ideal common optical axis direct view instead of an oblique view is formed since an optical axis (an object plane) of a user's eyes and an optical axis (an image plane) of the iris recognition imaging module 1 are identical.

The visible light LED (for example, the display screen 100 also may be used as an emission source of visible light) as recited in the specific embodiment 1 can be, still further, configured to indicate an appropriate user application scope such as a distance, and indicate recognition failure and recognition success information, etc.

The guidance/indication generated by an imaging feedback of an image displayed on the display screen:

Since the display imaging center of the display screen 100 and the optical center of the iris recognition imaging module 1 are not in the same optical axis, an oblique view instead of a direct view may be formed when the user views the guidance/indication generated by an image feedback of the display screen 100, the oblique view may directly cause deformation of a three-dimensional off-axis state of eyeball tissues, make an iris image produce non-geometric distortion, greatly decrease an iris recognition rate, and have a severely negative impact on using effect. Therefore, an oblique view off-axis state may be changed to a direct view on-axis state.

Figure 1:
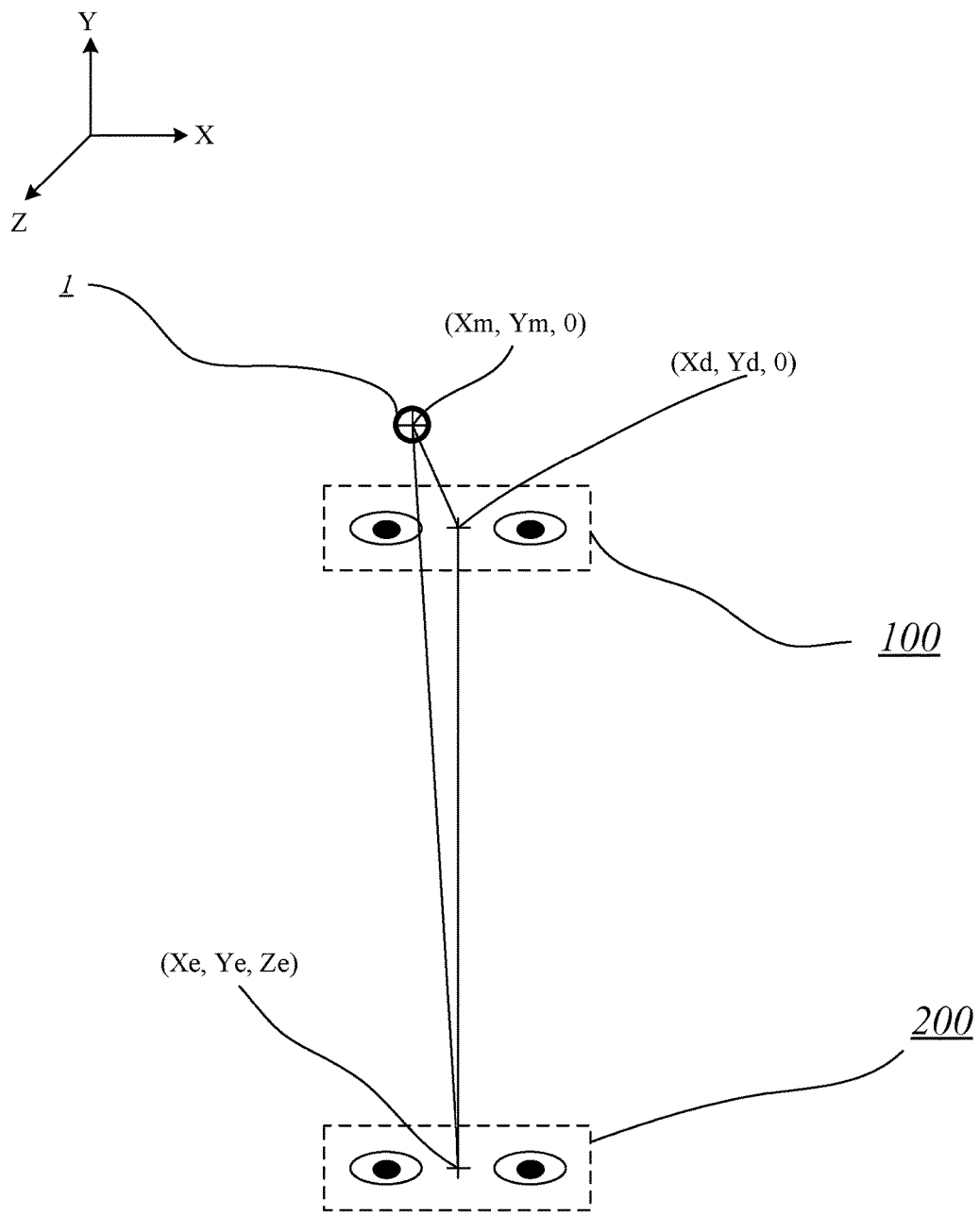
FIG. 1 is a schematic diagram of a human-machine interface guidance/indication method according to a specific embodiment 1 of the present disclosure (a schematic diagram of the center pixel offset or PAN/TILT(X/Y axis) angle rotation of the iris recognition imaging module 1)

In the present disclosure, a method of center pixel offset or PAN/TILT(X/Y axis) angle rotation of the iris recognition imaging module 1 is adopted to solve the aforementioned technical problems. FIG. 1 is a schematic diagram of the method of center pixel offset or PAN/TILT(X/Y axis) angle rotation of the iris recognition imaging module 1, and FIG. 1 consists of the iris recognition imaging module 1, the display screen 100 and the user's eyes 200. (Xd, Yd, 0) is an XYZ-axis coordinate of a physical location of the display imaging center of the display screen 100; (Xm, Ym, 0) is an XYZ-axis coordinate of a physical location of the optical center of the iris recognition imaging module 1; and (Xe, Ye, Ze) is an XYZ-axis coordinate of a physical location of the center of the user's eyes.

The method of center pixel offset adopted in the present disclosure:

1. The guidance/indication generated by an imaging feedback having a center pixel offset displayed on the display screen 100:

The display screen 100 is in signal connection with the processor chip 2, and the imaging sensor 14 acquires an image, specifically as follows.

The processor chip 2 controls to turn on the near-infrared LED lighting source 12; after an optical bioeffect in absorption, scattering and reflection at an objective iris, near-infrared light radiated by the near-infrared LED lighting source 12 enters into the near-infrared optical filter 11 and non-imaging disturbing light therein is filtered, filtered imaging wavelength light enters into the optical imaging lens 13; the optical imaging lens 13 is an automatic focusing (AF) optical imaging lens or a fixed focusing optical imaging lens and is configured to achieve an objective that non-contact optical physics are focused to the imaging sensor 14 positioned in image space, the imaging sensor 14 converts an image optical signal into an image electrical signal which is outputted into the processor chip 2, and the image is displayed on the display screen 100 after the image is processed by the processor chip 2 (center pixel offset).

Processes of the foregoing center pixel offset are specifically as follows (namely, center pixel offset is performed, through the processor chip 2, on an image outputted by the imaging sensor 14 and displayed on the display screen 100):

an imaging center pixel offset displayed on the display screen 100 is set up, and steps for calculating the imaging center pixel offset (X_PIXEL_OFFSET, Y_PIXEL_OFFSET) are as below:

$X\_PIXEL\_OFFSET = X\_OFFSET * PIXEL\_RESOULATION$ $Y\_PIXEL\_OFFSET = Y\_OFFSET * PIXEL\_RESOULATION$ $X\_OFFSET = Xd - Xm$ $Y\_OFFSET = Yd - Ym$ $PIXEL\_RESOULATION = POI/SOI$, wherein the X_OFFSET and the Y_OFFSET are XY-axis coordinate offsets of a physical location between the display imaging center of the display screen 100 and the optical center of the iris recognition imaging module 1.

The PIXEL_RESOULATION is an optical pixel resolution of the iris recognition imaging module 1.

The POI is a pixel dimension of a preset iris diameter; 150 pixel ≤ POI ≤ 300 pixel, and typically 200 pixel.

The SOI is a physical dimension of the preset iris diameter; 10 mm ≤ SOI ≤ 12 mm, and typically 11 mm.

The imaging center pixel offset (X_PIXEL_OFFSET, Y_PIXEL_OFFSET) shall meet:

$$X\_PIXEL\_OFFSET \leq 20\% * X\_ROI;\ \text{and}$$

$$Y\_PIXEL\_OFFSET \leq 20\% * Y\_ROI;\ \text{wherein}$$

the X_ROI is an X-axis full resolution pixel number of the imaging sensor 14; and the Y_ROI is a Y-axis full resolution pixel number of the imaging sensor 14.

If the imaging center pixel offsets X_PIXEL_OFFSET and Y_PIXEL_OFFSET are too large, the pixel number of the imaging sensor 14 for iris imaging may likely be reduced, and an iris imaging range may be decreased. As equivalently understood, ideal common optical axis direct view instead of an oblique view formed by adopting a mirrored visual feedback may also equivalently be X_PIXEL_OFFSET=Y_PIXEL_OFFSET=0.

By adopting the processing mode of center pixel offset in the present disclosure, it can be ensured that an iris image captured when the user views a feedback image displayed on the display screen 100 forms an offset direct view instead of an oblique view.

The optical axis (an object plane) of the user's eyes and the optical axis (an image plane) of the iris recognition imaging module 1 keep parallel even though a center offset may exist between both, and thus a center offset direct view instead of an oblique view is formed. As a result, a three-dimensional on-axis state of eyeball tissues does not deform, and an iris image does not produce any non-geometric distortion.

A method of PAN/TILT(X/Y axis) angle rotation of the iris recognition imaging module in the present disclosure:

2. Guidance/indication of the display screen 100 in displaying the iris recognition imaging module 1 (namely, an image generated by an imaging feedback of PAN/TILT(X/Y axis) angle rotation). The display screen 100 is in signal connection with the processor chip 2, and the processor chip 2 captures an image subjected to angle rotation outputted by the iris recognition imaging module 1 and the image is displayed on the display screen 100, specifically as follows.

The processor chip 2 controls to turn on the near-infrared LED lighting source 12; after an optical bioeffect in absorption, scattering and reflection at an objective iris, near-infrared light radiated by the near-infrared LED lighting source 12 enters into the near-infrared optical filter 11 and non-imaging disturbing light therein is filtered, filtered imaging wavelength light enters into the optical imaging lens 13; the optical imaging lens 13 is an automatic focusing (AF) optical imaging lens or a fixed focusing optical imaging lens and is configured to achieve an objective that non-contact optical physics are focused to the imaging sensor 14 positioned in image space, the imaging sensor 14 converts an image optical signal into an image electrical signal which is outputted into the processor chip 2, and the image (an image generated by an imaging feedback of angle rotation) is displayed on the display screen 100 after the image is processed by the processor chip 2.

An image displayed on the display screen 100 is subjected to PAN/TILT(X/Y axis) angle rotation of the iris recognition imaging module 1, and the PAN/TILT(X/Y axis) angle rotation of the iris recognition imaging module 1 is as below:

$$\theta PAN = \arctan((Xd-Xm)/Ze);\ \text{and}$$

$$\theta TILT = \arctan((Yd-Ym)/Ze).$$

By adopting the manner of the PAN/TILT angle rotation of the iris recognition imaging module 1 in the present disclosure, it can be ensured that an iris image captured when the user views a feedback image displayed on the display screen 100 forms an angle rotation direct view instead of an oblique view.

The optical axis (an object plane) of the user's eyes and the optical axis (an image plane) of the iris recognition imaging module 1 keep a direct view even though an angle rotation may exist, and thus an angle rotation direct view instead of an oblique view is formed. As a result, a three-dimensional on-axis state of eyeball tissues does not deform, and an iris image does not produce any non-geometric distortion.

The θPAN and θTILT angle rotation of the iris recognition imaging module 1 shall meet:

θPAN≤15 degrees; and

θTILT≤15 degrees.

If the θPAN and θTILT angle rotation of the iris recognition imaging module 1 is too large, this may cause that the installation of the iris recognition imaging module 1 in the mobile terminal becomes difficult and the volume of the iris recognition imaging module 1 increases, meanwhile, a large-angle optical incidence effect introduced by the iris recognition imaging module 1 may reduce an imaging effect.

As equivalently understood, ideal common optical axis direct view instead of an oblique view formed by adopting a mirrored visual feedback may also equivalently be θPAN=θTILT=0.

The display screen 100 set forth in the specific embodiment 1 may be, still further, configured to display text and image information indicating an appropriate user application scope such as a distance, and indicating recognition failure and recognition success, etc.

The display screen 100 in the specific embodiment 1 may be an LCD or an OLED.

According to specific embodiments described in the present disclosure, an iris recognition of a mobile terminal provides an effective human-machine interface guidance/indication when the mobile terminal is used by a user, an ideal common optical axis direct view instead of an oblique view is formed by adopting a mirrored visual feedback, and/or a direct view instead of an oblique view is generated by imaging feedback of an image displayed on the display screen. The guidance/indication generated by a mirrored visual feedback have naturality and convenience for use by a user. The guidance/indication generated by an imaging feedback of an image displayed on the display screen have a more obvious effect in directly viewing image and information displayed in real time. Therefore, by adopting the human-machine interface guidance/indication method according to the specific embodiments described in the present disclosure, a recognition speed and a recognition rate can be effectively improved, and still further use experience and convenience may be improved for a user.

The contents and technical features of the specific embodiments set forth in the present disclosure may be implemented within the same or equivalently understood scope, for example, scope change and device substitution may also be equivalently understood.

Finally, it is also to be noticed that the above listed are merely a plurality of specific embodiments in the present disclosure. Apparently, the present disclosure is not limited to the above embodiments, and may have many variations. Those of ordinary skill in the art may directly derive or think of all the variations from the contents disclosed in the present disclosure, and all the variations shall be deemed to be within the scope of protection of the present disclosure.

What is claimed is:

1. A human-machine interface guidance/indication device for iris recognition of a mobile terminal, comprising a mobile terminal and an iris recognition imaging module, wherein the mobile terminal comprises a processor chip and an display screen mutually in signal connection with the processor chip;
the processor chip is configured to receive an iris image outputted by the iris recognition imaging module, and to provide a feedback control to the display screen for the human-machine interface guidance/indication according to the iris image outputted by the iris recognition imaging module;
the feedback control to the display screen for the human-machine interface guidance/indication comprises a guidance/indication generated by a feedback of an image displayed on the display screen;
the guidance/indication generated by a feedback of an image displayed on the display screen is processed by the processor chip through a center pixel offset or PAN/TILT angle rotation processed by the iris recognition imaging module, and then is displayed on the display screen.

2. The human-machine interface guidance/indication device for iris recognition of a mobile terminal according to claim 1, wherein the center pixel offset or PAN/TILT angle rotation a pixel offset is generated between a display imaging center of the display screen and an optical center of the iris recognition imaging module.

3. The human-machine interface guidance/indication device for iris recognition of a mobile terminal according to claim 1, wherein:
a pixel offset, X_PIXEL_OFFSET, is generated between a display imaging center of the display screen and an optical center of the iris recognition imaging module;
and the pixel offset is processed by the following steps of:
setting an imaging center pixel offset X_PIXEL_OFFSET displayed on the display screen;
the imaging center pixel offset X_PIXEL_OFFSET is satisfied:

$X\_PIXEL\_OFFSET=X\_OFFSET*PIXEL\_RESOULATION$ $X\_OFFSET=Xd-Xm$

PIXEL_RESOULATION=$POI/SOI$; wherein the X_OFFSET are X-axis coordinate offsets of a physical location between the display imaging center of the display screen and the optical center of the iris recognition imaging module:
Xd is an X-axis coordinate of a physical location of the display imaging center of the display screen;
Xm is an X-axis coordinate of a physical location of the optical center of the iris recognition imaging module;
the PIXEL_RESOULATION is an optical pixel resolution of the iris recognition imaging module;
the POI is a pixel dimension of a preset iris diameter; and
the SOI is a physical dimension of the preset iris diameter.

4. The human-machine interface guidance/indication device for iris recognition of a mobile terminal according to claim 3, wherein:
the POI is satisfied: 150 pixel≤POI≤300 pixel;
the SOI is satisfied: 10 mm≤SOI≤12 mm;
the X_PIXEL_OFFSET is satisfied: X_PIXEL_OFFSET≤20%*X_ROI;
the X_ROI is an X-axis full resolution pixel number of the imaging sensor.

5. The human-machine interface guidance/indication device for iris recognition of a mobile terminal according to claim 1, wherein:
a pixel offset, Y_PIXEL_OFFSET, is generated between a display imaging center of the display screen and an optical center of the iris recognition imaging module;
and the pixel offset is processed by the following steps of:
setting an imaging center pixel offset Y_PIXEL_OFFSET displayed on the display screen;
the imaging center pixel offset Y_PIXEL_OFFSET is satisfied:

$Y\_PIXEL\_OFFSET=Y\_OFFSET*PIXEL\_RESOULATION$ $Y\_OFFSET=Yd-Ym$

PIXEL_RESOULATION=$POI/SOI$; wherein the Y_OFFSET are Y-axis coordinate offsets of a physical location between the display imaging center of the display screen and the optical center of the iris recognition imaging module:
Yd is an Y-axis coordinate of a physical location of the display imaging center of the display screen;
Ym is an Y-axis coordinate of a physical location of the optical center of the iris recognition imaging module;
the PIXEL_RESOULATION is an optical pixel resolution of the iris recognition imaging module;
the POI is a pixel dimension of a preset iris diameter; and
the SOI is a physical dimension of the preset iris diameter.

6. The human-machine interface guidance/indication device for iris recognition of a mobile terminal according to claim 5, wherein:
the POI is satisfied: 150 pixel≤POI≤300 pixel;
the SOI is satisfied: 10 mm≤SOI≤12 mm;
the Y_PIXEL_OFFSET is satisfied: Y_PIXEL_OFFSET≤20%*Y_ROI;
the Y_ROI is an Y-axis full resolution pixel number of the imaging sensor.

7. The human-machine interface guidance/indication device for iris recognition of a mobile terminal according to claim 3, wherein:
the pixel offset, X_PIXEL_OFFSET, between a display imaging center of the display screen and an optical center of the iris recognition imaging module is satisfied:
X_PIXEL_OFFSET 0.

8. The human-machine interface guidance/indication device for iris recognition of a mobile terminal according to claim 5, wherein:
the pixel offset, Y_PIXEL_OFFSET, between a display imaging center of the display screen and an optical center of the iris recognition imaging module is satisfied:
Y_PIXEL_OFFSET 0.

9. The human-machine interface guidance/indication device for iris recognition of a mobile terminal according to claim 2, wherein:
angle rotation θPAN/θTILT is generated between a display imaging center of the display screen and an optical center of the iris recognition imaging module;
the angle rotation θPAN/θTILT is satisfied:

$θPAN=\arctan((Xd-Xm)/Ze)$ $θTILT=\arctan((Yd-Ym)/Ze)$ wherein, (Xd, Yd, 0) is an XYZ-axis coordinate of a physical location of the display imaging center of the display screen;

(Xm, Ym, 0) is an XYZ-axis coordinate of a physical location of the optical center of the iris recognition imaging module; and (Xe, Ye, Ze) is an XYZ-axis coordinate of a physical location of a center of the user's eyes.

10. The human-machine interface guidance/indication device for iris recognition of a mobile terminal according to claim 9, wherein:

the angle rotation θPAN/θTILT is satisfied:

θPAN≤15 degrees; and

θTILT≤15 degrees.

11. The human-machine interface guidance/indication device for iris recognition of a mobile terminal according to claim 9, wherein:

the angle rotation θPAN/θTILT between a display imaging center of the display screen and an optical center of the iris recognition imaging module is satisfied:

θPAN=θTILT=0.

12. The human-machine interface guidance/indication device for iris recognition of a mobile terminal according to claim 1, wherein the display screen is configured to display information indicating an appropriate user application scope, recognition failure and recognition success.

13. The human-machine interface guidance/indication device for iris recognition of a mobile terminal according to claim 1, wherein the display screen is an LCD or an OLED.

14. The human-machine interface guidance/indication device for iris recognition of a mobile terminal according to claim 1, wherein the iris recognition imaging module comprises an imaging sensor and a near-infrared LED lighting source, a near-infrared optical filter and an optical imaging lens.

\* \* \* \* \*